(12) United States Patent
Koenig (10) Patent No.: US 9,253,331 B2
(45) Date of Patent: Feb. 2, 2016

(54) CALL HANDLING

(71) Applicant: Microsoft Technology Licensing, LLC, Redmond, WA (US)

(72) Inventor: Lionel Koenig, Stockholm (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/173,523

(22) Filed: Feb. 5, 2014

(65) Prior Publication Data
US 2015/0124950 A1     May 7, 2015

(30) Foreign Application Priority Data
Nov. 7, 2013   (GB) .................................. 1319687.8

(51) Int. Cl.
| | |
|---|---|
| *H04M 3/42* | (2006.01) |
| *H04M 11/00* | (2006.01) |
| *H04M 1/00* | (2006.01) |
| *H04L 12/16* | (2006.01) |
| *H04Q 11/00* | (2006.01) |
| *H04M 3/56* | (2006.01) |

(52) U.S. Cl.
CPC .............. *H04M 3/563* (2013.01); *H04M 3/568* (2013.01)

(58) Field of Classification Search
CPC ............. H04M 2203/2072; H04M 2203/2094; H04M 2203/5054; H04M 3/42; H04M 3/42221; H04M 3/42246; H04M 3/42348; H04M 3/56; H04M 3/562; H04M 3/563; H04M 3/564; H04M 3/565; H04M 3/566; H04M 3/567; H04M 3/568; H04M 7/006; H04M 7/15; H04M 7/146; H04L 12/18; H04L 12/1813; H04L 12/581; H04L 65/403; H04L 67/24

USPC ................ 379/90.01, 93.01, 93.21, 157, 158, 379/201.01, 202.01, 207.01; 370/259, 260, 370/261, 262; 455/414.1, 416
See application file for complete search history.

(56) References Cited

U.S. PATENT DOCUMENTS

| | | | |
|---|---|---|---|
| 6,853,716 B1 * | 2/2005 | Shaffer et al. ............ | 379/202.01 |
| 7,617,094 B2 | 11/2009 | Aoki et al. | |
| 7,742,587 B2 | 6/2010 | Cohen | |
| 7,856,248 B1 * | 12/2010 | Fujisaki ..................... | 455/556.1 |
| 7,876,890 B2 | 1/2011 | Diethorn | |
| 7,924,995 B2 | 4/2011 | Diethorn | |
| 8,126,129 B1 | 2/2012 | McGuire | |
| 8,224,351 B1 | 7/2012 | Sushkov et al. | |
| 8,284,916 B2 | 10/2012 | Danielsen | |
| 2003/0108002 A1 * | 6/2003 | Chaney et al. ............... | 370/261 |
| 2004/0221037 A1 * | 11/2004 | Costa-Requena et al. .... | 709/225 |
| 2006/0125786 A1 | 6/2006 | Genz | |
| 2007/0172047 A1 * | 7/2007 | Coughlan et al. .......... | 379/202.01 |
| 2008/0139182 A1 * | 6/2008 | Levy et al. .................. | 455/414.1 |

(Continued)

OTHER PUBLICATIONS

"International Search Report and Written Opinion", Application No. PCT/US2014/063769, Apr. 21, 2015, 12 pages.

*Primary Examiner* — Khai N Nguyen
(74) *Attorney, Agent, or Firm* — Jim Ross; Micky Minhas; Wolfe-SBMC (57) ABSTRACT

Disclosed herein is a technique whereby a user device joins a call conducted over a network, generates audio which can be processed to identify that user device and, during the call, outputs the audio such that it can be received by another user device in the vicinity of the user device which is already participating in the call, thereby enabling the other user device to identify that user device.

22 Claims, 9 Drawing Sheets

(56) References Cited

U.S. PATENT DOCUMENTS

| | | |
|---|---|---|
| 2009/0094029 A1* | 4/2009 | Koch et al. .................... 704/246 |
| 2009/0176505 A1* | 7/2009 | Van Deventer et al. .... 455/456.1 |
| 2010/0020962 A1* | 1/2010 | Shoval et al. ............ 379/399.01 |
| 2010/0104080 A1* | 4/2010 | Appelman et al. ....... 379/142.04 |
| 2010/0177880 A1* | 7/2010 | Danielsen ................ 379/202.01 |
| 2011/0038469 A1* | 2/2011 | Clark et al. .................. 379/130 |
| 2011/0289224 A1 | 11/2011 | Trott |
| 2012/0220347 A1* | 8/2012 | Davidson ...................... 455/567 |
| 2012/0281596 A1* | 11/2012 | Danielsen ..................... 370/261 |
| 2013/0024196 A1* | 1/2013 | Ganong et al. ................ 704/246 |
| 2013/0070916 A1* | 3/2013 | Appelman et al. ......... 379/93.01 |
| 2013/0073655 A1* | 3/2013 | Appelman et al. ............ 709/206 |
| 2013/0198635 A1* | 8/2013 | Jones et al. ................... 715/727 |
| 2013/0321133 A1* | 12/2013 | Michaelis et al. ......... 340/10.42 |
| 2014/0067381 A1* | 3/2014 | Li et al. ........................ 704/201 |

\* cited by examiner

CALL HANDLING

RELATED APPLICATIONS

This application claims priority under 35 USC §119 or §365 to Great Britain Patent Application No. 1319687.8 entitled "Call Handling" filed Nov. 7, 2013 by Lionel Koenig, the disclosure of which is incorporate in its entirety.

BACKGROUND

Conference calls between more than two users can be conducted "online"—that is, over a suitable network, such as the Internet, possibly via a conference server—for instance in a virtual meeting or group calling scenario. A suitable user device (e.g. Personal Computer, Tablet Device, Smartphone, VoIP telephone etc.) participates in such a call using one or more loudspeakers and one or more microphones housed in, our coupled to, the user device. Typically, a user device joining a call may, at some stage, play-out an audible "ringtone" as part of this process.

In an online conference call scenario, a situation may arise in which two or more participants are in the same room or otherwise collocated (that is, in the vicinity of one another) during the conference call. For instance, a first user at a first user device may be participating in the call when a second user at a second user device in the same room joins the call. Any ringtone played-out by the second user device may be captured by the first user device and recognized in the microphone signal path of the first user device; if so, the first user may be notified of the possibility that another user in their vicinity has joined the call. The first user can then turn to the second user and if so ask him to mute his user device.

SUMMARY

According to the present disclosure a user device comprises a network interface for connecting to a network and an audio output component for outputting audio signals. The user device also comprises a processor configured to execute a communication client. This client is operable to join a call conducted over said network. At the user device, the client is further operable to code an identifier into audio generated at the user device and, during the call, to output said audio via the audio output component. The audio is output such that said audio can be received and processed to identify the user device by another user device, in the vicinity of the user device, already participating in the call.

Further, according to the present disclosure, a user device comprises a network interface for connecting to a network and an audio input component for receiving audio signals. The user device also comprises a processor configured to execute a communication client. This client is operable to participate in a call conducted over said network. Whilst the client is participating in the call, the client is further operable to receive audio via the audio input component, said audio having been generated at another user device in the vicinity of the user device and output by the other user device during the call—an identifier associated with the user device having been coded into said audio at the other user device. At the user device, the client is further operable to extract the identifier from the received audio to identify the other user device.

Also disclosed are corresponding methods and computer program products.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the scope limited to addressing any disadvantages noted herein.

BRIEF DESCRIPTION OF DRAWINGS

For an understanding of the present subject matter and to show how the same may be put into effect, reference will now be made, by way of example, to the following drawings in which.

DETAILED DESCRIPTION

Techniques based on recognizing known ringtones, such as that described above, ultimately rely on "joiners" (that is, user devices joining a call) being manually identified by other call participants. Further, such techniques may be ill-suited to automatically identifying joiners, not least because, even a known ringtone is recognized in a microphone signal path of a user device participating in the call, the source of this ringtone cannot be unambiguously identified therefrom, e.g. two user devices may join a call and play-out the same ringtone simultaneously. This known ringtone may then be recognized in the microphone signal path of a third user device but there is no way of knowing whether the source of this recognized ringtone is the first user device, second user device, or even another user device which happens to join a completely different call at the same time (as they could all be using the same ringtone).

Embodiments will now be described with reference to the accompanying drawings. In the described embodiments, each joiner plays-out (outputs) a specific ringtone, unique to that joiner, when joining an online conference. In these embodiments, audio of the unique ringtone is generated by a client of the joiner, with an identifier associated with that joiner being coded into the generated audio. Audio data of the ringtone could be generated, for example, using pre-recorded signals, or could be generated from scratch using sound synthesis functions. Generating of the ring tone by a client at the user device joining the call represents a network bandwidth saving as compared with, say, centralized generation within a network as no audio data for the ringtone needs to be transmitted over the network. The unique ringtone is subsequently played-out in a way that, this ringtone, when detected by other attendants in their respective microphone signals, allows the other attendants to identify the new joiner. The played-out ringtone is effectively a modulated/watermarked ringtone containing an encoded joiner identifier. It could be a readily detectable modulation (e.g. time-frequency modulation based) or a watermark encoded in the audio. In accordance with the present disclosure, a joiner identifier (ID) is embedded in a ring tone. Different embedding means for so embedding the joiner ID are envisaged. One embodiment, described below, uses a time frequency modulation; existing audio processing architecture found in existing VoIP client application (e.g. as used for echo cancellation) can be readily adapted to extract a joiner ID embedded in this way. Other embodiments use different forms of embedding.

The audio is generated "in-the-field" (i.e. in operation by the client of the user device) e.g. in real-time. The audio may be generated from, or at least based on, non-audio data (in contrast to pre-determined audio which is, say, pre-recorded and/or pre-rendered during a design phase, pre-stored, and merely played-out in-the-field). Here, "audio data" includes both uncompressed audio data and compressed audio data (e.g. created with an audio codec, voice codec etc.), with compression including both lossless and lossy compression formats (non-audio data being data which does not fall within this definition of audio data). The non-audio data may comprise an identifier of the user and/or device, the identifier being coded into the generated audio. The non-audio data may comprise abstract parameters, such as pitches and/or timings of tones, as opposed to recorded samples, the audio thus being 'artificially' generated. For instance, the identifier may be represented as a time-frequency distribution of these tones.

Figure 1:
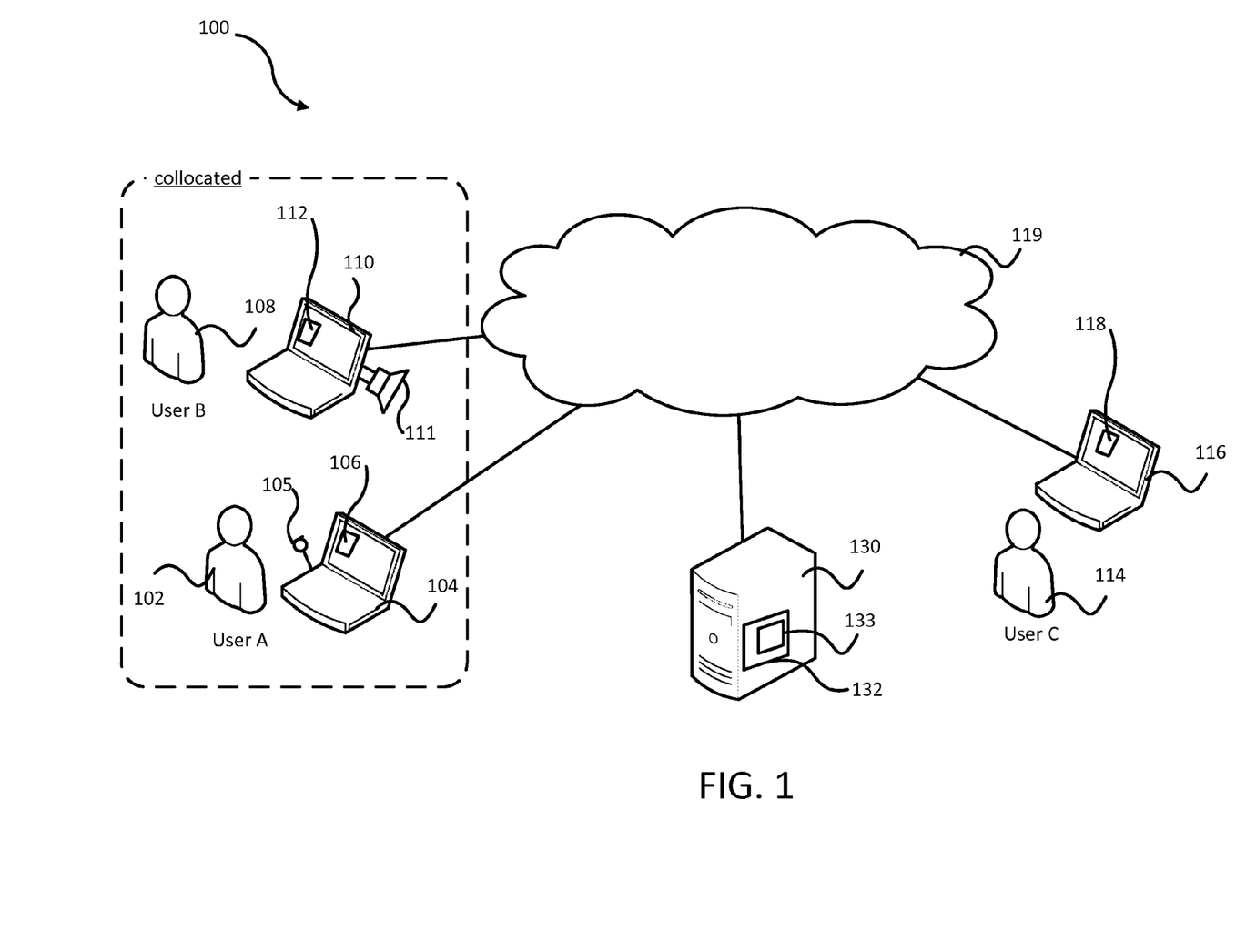
FIG. 1 is a schematic view of a communication system.

FIG. 1 shows a communication system 100 comprising a first user 102 ("User A") who is associated with a first user device 104; a second user 108 ("User B") who is associated with a second user device 110; a third user 114 ("User C") who is associated with a third user device 116; and a conference server 130, all of which are connected to a network 119. User devices 104, 110 and 116 are arranged to receive information from and output information to users 102, 108 and 114 respectively. In particular, user device 104 comprises an audio input component, which itself comprises a microphone 105 for capturing audio signals, and user device 110 comprises an audio output component, which itself comprises a loudspeaker 111 for outputting audio signals. The first and second user devices are collocated (that is, in the vicinity of one another).

The communication system 100 shown in FIG. 1 is a packet-based communication system, but other types of communication system could be used. The network 119 may, for example, be the Internet. Each of the user devices 104 and 110 may be, for example, a mobile phone (e.g. smartphone), a tablet, a laptop, a personal computer ("PC") (including, for example, Windows®, Mac OS® and Linux® PCs), a gaming device, a television, a personal digital assistant ("PDA") or other embedded device able to connect to the network 119.

The user device 104 executes an instance of a communication client 106. The communication client is a software program executed on a local processor in the user device 104. The client performs the processing required at the user device 104 in order for the user device 104 to transmit and receive data over the communication system 100.

The user device 110 also executes, on a local processor, an instance of a communication client 112 which corresponds to the client 106. The client 112 at the user device 110 performs the processing required to allow the user 108 to communicate over the network 119.

The user device 116 also executes, on a local processor, an instance of a communication client 118 which corresponds to clients 106 and 112. The client 118 at the user device 116 performs the processing required to allow the user 114 to communicate over the network 119.

The user devices 104, 110 and 116 are endpoints in the communication system 100.

In this embodiment, the client instances 106, 112 and 118 are provided by a software provider associated with the communication system 100 and perform the required processing in the same manner.

FIG. 1 shows only three users (102, 108 and 114) and three user devices (104, 110 and 116) for clarity, but many more users and user devices may be included in the communication system 100, and may communicate over the communication system 100 using respective communication clients executed thereon.

In an alternative embodiment, the communication system 100 is a peer-to-peer communication system in which the server 132 is omitted, the functionality of server 132 being implemented at one or both of user devices 104, 110 by one or both of clients 106, 112.

Figure 2A:
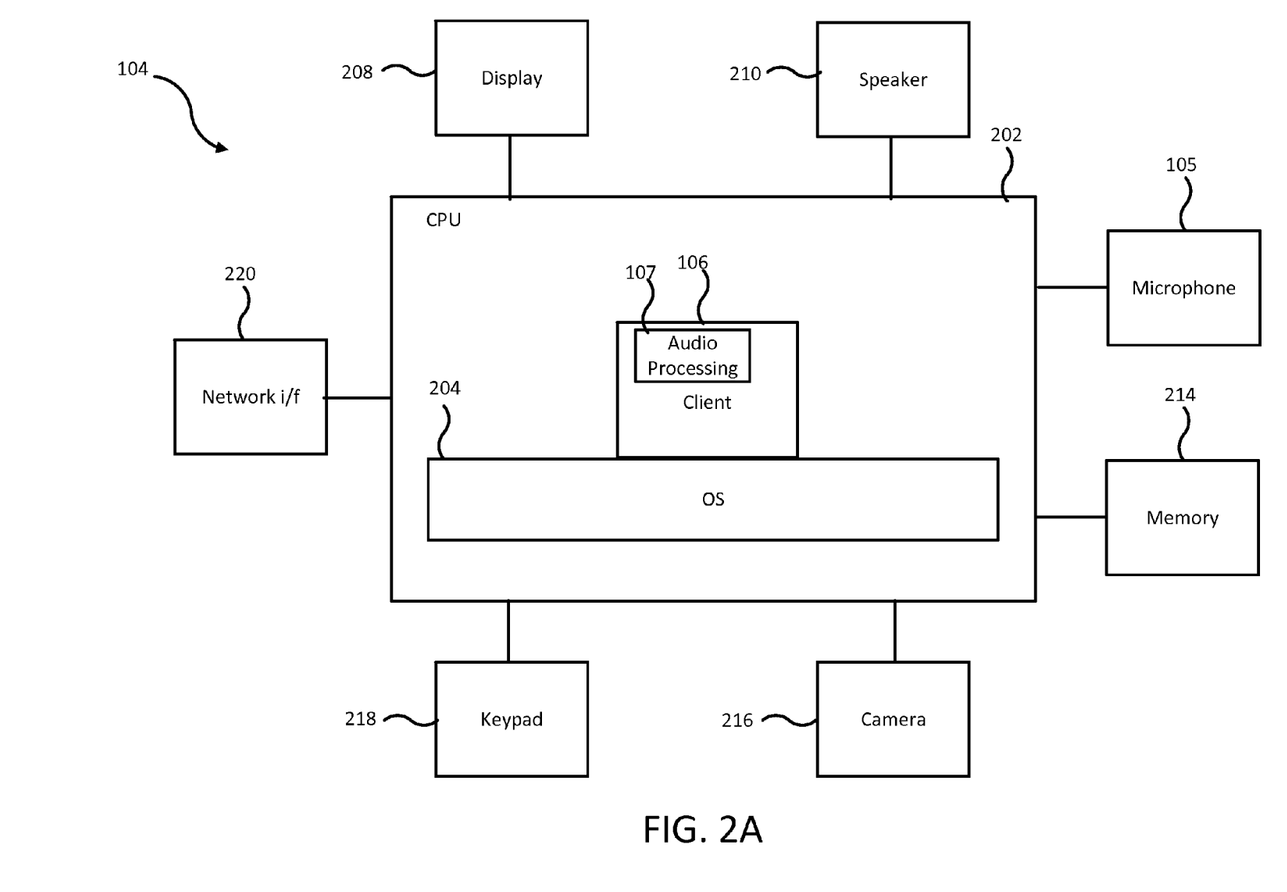
FIG. 2A is a schematic view of a first user device.

FIG. 2A illustrates a detailed view of the user device 104 on which is executed communication client instance 106 for communicating over the communication system 100. The user device 104 comprises a processor in the form of a central processing unit ("CPU") 202. It will of course be appreciated that the processor could take alternative forms, such as a multi-core processor comprising multiple CPUs. The following components are connected to CPU 202: output devices including a display 208, (implemented e.g. as a touch-screen), and a loudspeaker 210 for outputting audio signals; input devices including microphone 105 for capturing audio signals, a camera 216 for capturing images, and a keypad 218; a memory 214 for storing data; and a network interface 220 such as a modem for communication with the network 119. The display 208, loudspeaker 210, microphone 105, memory 214, camera 216, keypad 218 and network interface 220 are integrated into the user device 104, although it will be appreciated that, as an alternative, one or more of the display 208, loudspeaker 210, microphone 105, memory 214, camera 216, keypad 218 and network interface 220 may not be integrated into the user device 104 and may be connected to the CPU 202 via respective interfaces.

Figure 2B:
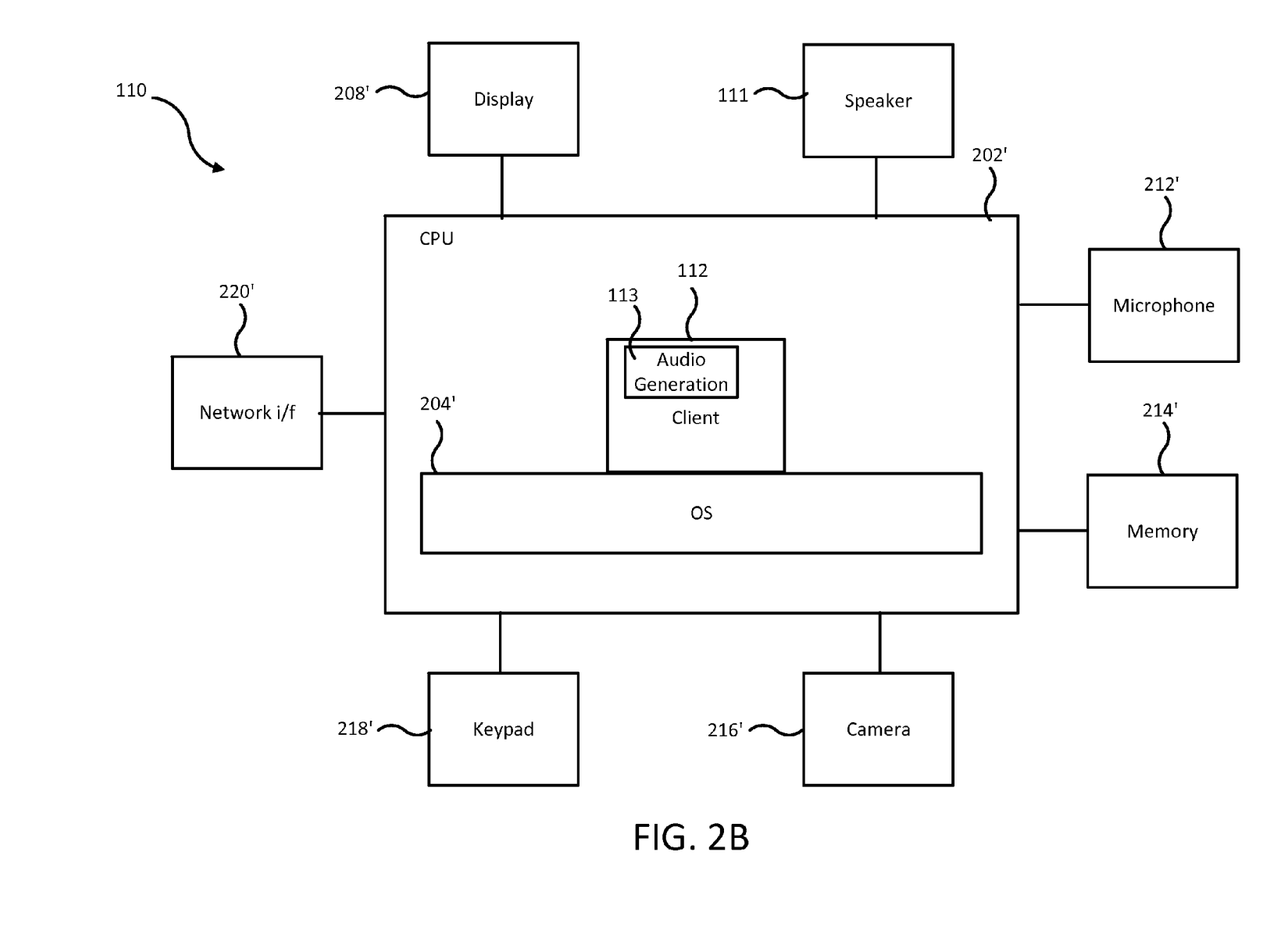
FIG. 2B is a schematic view of a second user device.

In alternative embodiment, one or both of the user devices 104, 110 could be a conference phone or a meeting phone without one or more of the display, camera, keypad etc.

FIG. 2A also illustrates an operating system ("OS") 204 executed on the CPU 202. Running on top of the OS 204 is the software of the client instance 106 of the communication system 100. The operating system 204 manages hardware resources of the user device 104 and handles data being transmitted to and from the network 119 via the network interface 220. The client 106 communicates with the operating system 204 and manages the connections over the communication system. The client 106 has a client user interface which is used to present information to the user 102 and to receive information from the user 102. In this way, the client 106 performs the processing required to allow the user 102 to communicate over the communication system 100.

Client 106 comprises an audio processing block 107 which receives audio captured by microphone 105. The functions of block 107 are described in more detail below.

FIG. 2B illustrates a detailed view of the user device 110 on which is executed communication client instance 112 for communicating over the communication system 100. The user device 110 comprises a processor in the form of a central processing unit ("CPU") 202'. It will of course be appreciated that the processor could take alternative forms, such as a multi-core processor comprising multiple CPUs. The following components are connected to CPU 202: output devices including a display 208', (implemented e.g. as a touchscreen), and a loudspeaker 111 for outputting audio signals; input devices including microphone 212' for capturing audio signals, a camera 216' for capturing images, and a keypad 218'; a memory 214' for storing data; and a network interface 220' such as a modem for communication with the network 119. The display 208', loudspeaker 111, microphone 212', memory 214', camera 216', keypad 218' and network interface 220' are integrated into the user device 110, although it will be appreciated that, as an alternative, one or more of the display 208', loudspeaker 111, microphone 212', memory 214', camera 216', keypad 218' and network interface 220' may not be integrated into the user device 110 and may be connected to the CPU 202' via respective interfaces.

FIG. 2B also illustrates an operating system ("OS") 204' executed on the CPU 202. Running on top of the OS 204' is the software of the client instance 112 of the communication system 100. The operating system 204' manages hardware resources of the user device 110 and handles data being transmitted to and from the network 119 via the network interface 220'. The client 112 communicates with the operating system 204' and manages the connections over the communication system. The client 112 has a client user interface which is used to present information to the user 108 and to receive information from the user 108. In this way, the client 112 performs the processing required to allow the user 108 to communicate over the communication system 100.

Client 112 comprises an audio generation block 113 which generates audio to be output from loudspeaker 111. The functions of block 113 are described in more detail below.

User device 116 has a similar constitution to user devices 104 and 110.

User clients 106, 112 and 118 communicate with one another via conference server 130—which acts as a "host" of the call in this embodiment—thereby allowing users 102, 108 and 114 to conduct a "conference call" whereby all three users can speak to and hear one another contemporaneously. As shown in FIG. 1, conference host 130 comprises a processor 132 executing a call manager 133 (one form of hosting means for hosting a multi-party conference call) which manages the conference call. Call manager 133 receives audio captured at user devices 104, 110 and 116 respectively over network 119. The audio from user devices 110 and 116 is mixed by the call manager 133 and transmitted to user device 104 where it is output by loudspeaker 210 so that user 102 can hear both user 108 and user 114. Similarly, the audio from user devices 104 and 116 is mixed by the call manager 133 and transmitted to user device 110 and the audio from user devices 104 and 110 is mixed by the call manager 133 and transmitted to user device 116. In addition to receiving and transmitting audio, call manager 133 is operable to receive and transmit notifications and control messages to and from clients 106, 112 and 118. As will be appreciated, other users can also participate in the conference call.

In alternative embodiments, the functionality of server 130 may be implemented at one or more of user devices 104, 110 and 116 instead. For instance, one of user devices 104, 110 and 114 may "host" the call in which case the client at that user device may perform some or all of the functions of call manager 133. Alternatively or additionally, the functionality of server 130 may be distributed among several computing devices including servers and/or other user devices. That is, the hosting means may be embedded in any client such as 104, 112 or 118 (which are peer-to-peer clients in this embodiment) rather than at a server (e.g. 130), which may be omitted.

Figure 3:
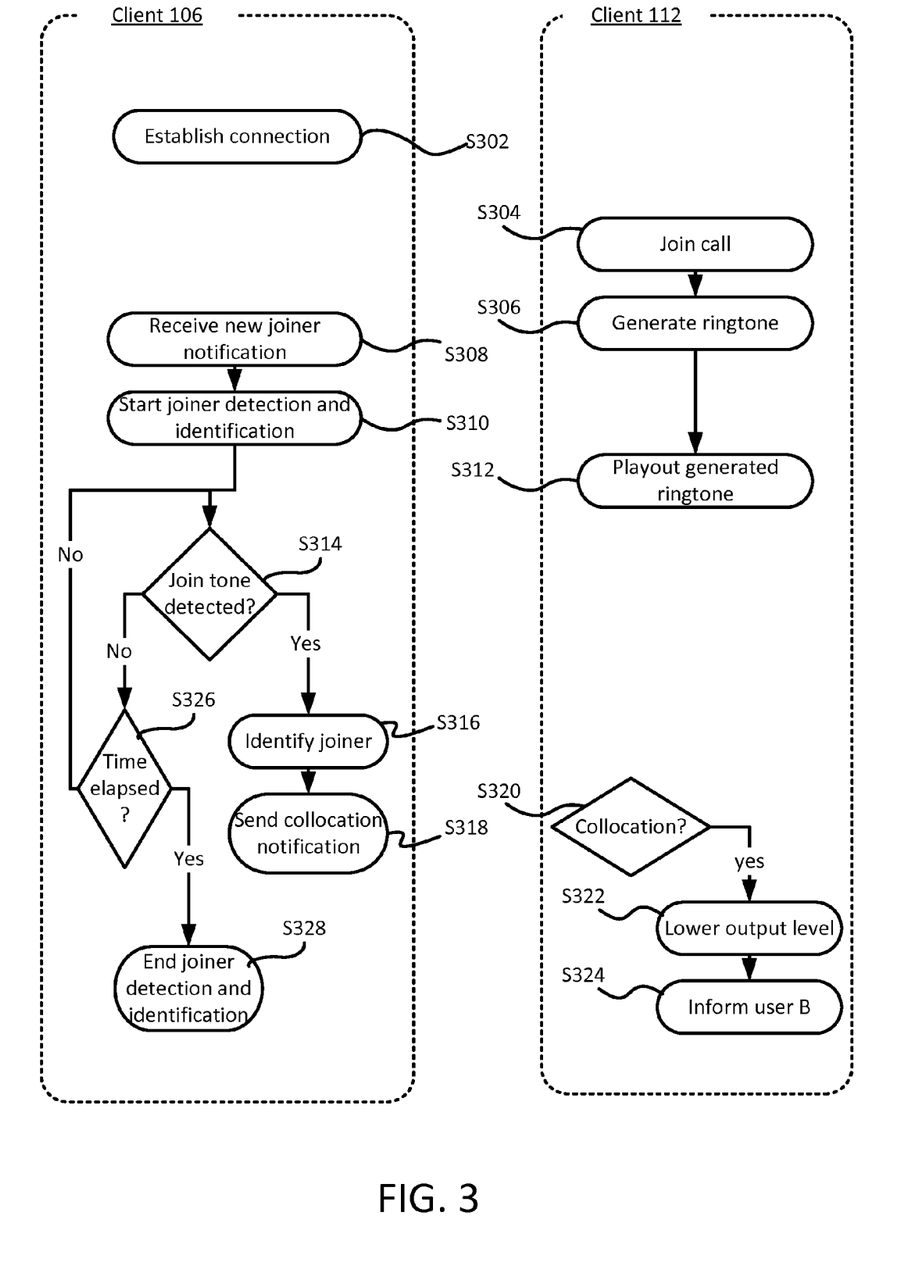
FIG. 3 is a schematic illustration of a method of handling a call.

A method will now be described with reference to FIG. 3 which enables the first user device 104, participating in a call, to detect and identify the collocated second user device 110 which subsequently joins the call. This information may be then used to autonomously adapt audio levels at the second user device in order to prevent feedback and echo which might otherwise be caused due to collocation of the first and second user devices and/or to inform the second user of said identification by the first user device. As will be appreciated, however, it is possible to make use of this information in other ways. For example, this information could be used as follows:

a. To select one of the microphone of the user device 104 and the microphone of user device 110 for use during the call to ensure the right microphone is 'picked up'. E.g. one of said user devices may have a better quality microphone (e.g. a higher-cost, higher-quality, external room microphone coupled to that device) than the other (e.g. which may be a laptop, tablet or phone housing a lower-cost, low-quality microphone)—the higher quality microphone may be selected in favour of the lower-quality microphone for use during the call by both users 102 and 108. This selection by a selection component (implemented e.g. by of the clients 106, 112, 118 and the call manager 133) may be triggered by one of user devices 104, 110 in response to the joiner identification.

b. For purposes of audio processing by an audio processing component (implemented e.g. by of the clients 106, 112, 118 and the call manager 133) to which user devices 104, 110 supply respective microphone signals, e.g.:

i. to process all microphones in the same room as an array e.g. using beamforming (a signal processing technique known in the art);

ii. to make use of the collocated setup to enhance user experience by providing "fake" stereo; that is to aggregate the microphone signals as a stereo audio signal e.g. the microphone of one of user devices 104, 110 providing a left-hand channel the stereo audio signal and the microphone of the other providing a right-hand channel of the stereo audio signal.

At S302, client 106 establishes a connection with the host (which is the conference server 130 in this embodiment but which could be another client e.g. 106, 112, 118 as in peer-to-peer embodiments as discussed) over network 119, by which connection client 106 participates in a conference call over network 119.

In this embodiment, the client 112 of the second user device 110 presents, to user 108 ("User B") via the user interface of client 112, an option to join the call, the option being selectable by user 108. The selectable option may be implemented e.g. as a soft-button or other soft-input mechanism displayed on a touchscreen. As will be appreciated, there are many other ways in which a user can join an on-going (conference) call.

This option may, for instance, be displayed in response to an invitation received from the network 119 or alternatively in a manner which enables user 108 to join a call of their own volition (e.g. an option to join a pre-arranged virtual meeting). A generic, pre-recorded ringtone (410 in FIG. 4B) may be played-out to notify user 108 either in response to an invitation (e.g. to inform the user of the invitation to join the call) or in response to the user selecting to join the call of their own volition (e.g. to notify the user that they have successfully joined the meeting). As shown in FIG. 4B, the generic ringtone is substantially homogenous across a range of frequencies.

Responsive to user 108 selecting the option (e.g. by tapping or swiping the touchscreen, or by making a suitable voice command captured by microphone 212' or gesture captured by camera 216'), client 112 establishes a connection with the conference server 130 over network 119, by which connection client 112 joins the call (S304).

At step S306, the audio generation block 113 of client 112 generates audio data to be played-out of loudspeaker 111 as a bespoke ringtone. This ringtone is unique to that device within the call (i.e. such that no other user devices use the same ringtone if and when they join the call). In this embodiment, the audio data is generated upon joining the call, but in other embodiment the audio data may be generated sooner (for instance, in response to receiving a call invitation).

The audio data is generated algorithmically based on an input which, in this case, is non-audio data comprising an identifier associated with the user device 110 (described below with reference to FIGS. 4A-C). In this embodiment, the audio data is generated to code the identifier, such that by another device receiving the bespoke ringtone can extract the identifier can be therefrom (i.e. decode the received bespoke ringtone). The identifier is unique to that user device within the call and contains sufficient information for the call manager 113 to ascertain a network address of an identified user. The joiner client may also output audio comprising (e.g. coding) an indication that the coded identifier is intended for another user device which is currently participating in a call (e.g. as opposed to a user device which is not currently participating in any call). The indication may also be coded into the generated audio by the joiner client, or it be output by way of the generic, pre-recorded ringtone, described above.

The identifier may, for instance, be a numerical, alphabetical or alphanumerical value assigned to client 112 by call manager 133 upon client 112 joining the call (in which case, call manager 133 stores identifiers in association with network addresses of each participant). Alternatively, the identifier may be e.g. the network address itself, a username of user 108 (which the call manager is operable to associate with a corresponding network address), or a suitable function of either of these. For example, the joiner ID may be of the form user@userdevice-1254621 or similar.

In embodiments, the identifier may also be unique to that user within the network such that no other user devices connected to the network are associated with that identifier (this is the case e.g. if the identifier is, or is based on, a username or network address etc.). Alternatively, the identifier may simply be unique to that user at the time of play-out such that no other users on the call use the same ringtone contemporaneously with that user (but may generate and play out the same ringtone at different times), with ringtone generation and play out being scheduled e.g. by the call manager 133 and/or comprising a time stamp, an IP ("Internet Protocol") address or anything else unique at that time (i.e. to achieve temporal uniqueness without any scheduling by the call manager 133).

Characteristics of the combination of the generic ringtone and the bespoke ringtone include a common part (generic ringtone), either in time, in frequency or anything else e.g. allowing other user devices identify that it is a joiner tone (as opposed to e.g. background audio or background noise), and a part which is specific to each joiner allowing the system to identify the user/device joining. In other embodiment, the generic ringtone may be omitted and only the bespoke ringtone generated and played-out.

At step S308, client 106 receives a notification from call manager 133 that a new user has joined the call. Call manager 133 sends an equivalent notification to any other user devices participating in the call. Responsive thereto, at step S310, client 106 instigates a detection phase (SS314) during which the audio processing block 107 of client 106 attempts to detect and identify any collocated user devices by processing audio captured by microphone 105 in a predefined manner (explained below with reference to FIGS. 6A and 6B). An alternative would be running detection at the host side. However in that case, the host will need to run n−1 detections in parallel where n is the number of participant in the conference.

Further, a collocated client may directly benefit from the outcome of the detection it performs itself (inform user, start specific actions based on collocated signal, etc.)

At step S312, client 112 outputs the generated ringtone from loudspeaker 111. The audio output by the client 112 of the user device 110 contains a coding of said identifier.

The ringtone is output by user device 110 during the call; that is, such that that the bespoke ringtone is played-out for at least a period subsequent to the client 112 joining the call. In this embodiment, that output is upon joining the call; that is, such that that the bespoke ringtone is played-out for at least a period subsequent to the client 112 joining the call and such that play-out timing is at least partially correlated with the client 112 joining the call (e.g. with at least one of play-out initiation and termination being dependent on joining the call). Alternatively, generation and/or output of a bespoke tone could be triggered on purpose (i.e. responsive to other types of event) to identify collocated users (i.e. rather than reacting to a user device joining the call). As used herein, "during a call" refers to a period commencing with initiation of that call (e.g. by one of clients 106, 112, 118) and ending with termination of that call, with e.g. output of ringtones by called clients thus occurring during the call, the call having been initiated by e.g. another client calling those clients.

In this embodiment, play-out of the generated ringtone is initiated responsive to joining the call. In alternative embodiments, play-out of the generated ringtone may be initiated responsive to an earlier event (e.g. receipt of an invitation to join the call), such that the generated ringtone is played out for a period before joining the call, with play-out being continued for a period after joining the call and then terminated. It should be noted that, in both scenarios, the generated ringtone is played out upon joining the call.

The generated ringtone is played-out for at least a period commencing when, or shortly after, client 112 joins the call so as to coincide with the aforementioned detection phase of client 106.

Although shown as separate, steps S306 and S312 may be performed substantially contemporaneously such that the ringtone is played-out as it is generated.

During the detection phase (S314), client 106 of user device 110 is operable to detect whether bespoke ringtone(s), generated and output by other user device(s), are present in the audio captured by microphone 105. Provided the second user device 110 is sufficiently close to (that is, in the vicinity of) the first user device 104, the bespoke ringtone output by client 112 is captured by microphone 105 of user device 104 and detected by client 106 during the detection phase. If such a bespoke ringtone is detected, the method proceeds to step S316. At step 316, client 106 identifiers the second user device by decoding the identifier coded in the bespoke ringtone (as described in more detail below). Client 106 is thus not only able to determine that another user device is in its vicinity (by virtue of successfully receiving and decoding the identifier) but is also able to identify user device 110 (on the basis of the decoded identifier).

Clients 106 and 112 are (collectively) operable to handle the call in dependence on said identification e.g. by modifying operation of at least one of user devices 104 and 110. The manner in which the call is handled in this embodiment specifically is described in detail below.

Responsive to identification of user device 110, client 106 transmits a notification to conference server 130 over network 119. The notification contains the decoded identifier of user device 112 and indicates to call manager 133 that the second user device is in the vicinity of the first user device. Responsive to receipt of this notification, call manager 133 transmits a control message to user device 110 instructing client 110 to reduce an audio output level of user device 110 by muting loudspeaker 111 (effectively reducing the audio output level to zero). As will be appreciated, this (i.e. the collocation detection algorithm providing collocation information which is sent back to the server to allow that information to be shared across all collocated devices) is one example use of collocation information (others are discussed above).

In alternative embodiments, the notification to conference server may be omitted (e.g. the disclosed technique could also be used to take an action locally by the client 106 at the user device 114).

At step S320, client 112 receives the control message from server 130. Responsive thereto (S322), client 112 reduces the audio output level of user device 110 by muting loudspeaker 111 as instructed. At step S324, client notifies user 108 of this via the user interface of client 112.

Reducing the audio output level at the second device prevents feedback and echo which might otherwise occur due collocated loudspeaker 111 of user device 110 and microphone 105 of user device 104 creating an audio loop (in which audio from speaker 111 is captured by microphone 105, transmitted over network 119 to user device 110 and output from loudspeaker 111 etc.). Alternatively, both the loudspeaker and/or microphone of the user device may be muted, or any action taken to ensure that the new joiner does not interfere with the on-going conference call unless it specifically elects to do so (e.g. by unmuting).

If no bespoke ringtone is initially detected (S314), joiner identification and detection (i.e. the detection phase) continues until a joiner is identified or until a predetermined period of time has elapsed (S326). If no joiner ringtone is detected within that period, the detection phase is terminated (S328) and attempted joiner detection and identification ends.

As used herein, a user device "participates" in a call at least when configured to either of a connecting mode (in which the user device is aware of the call but cannot receive or transmit real-time media data of the call to/from other call participants e.g. a ringing mode to which the user device has been configured in response to calling, or being called by, another user device or a conference server) or a connected mode (in which real-time media data of the call can flow between that user device and at least one other user device). A user device "joins" a call upon configuration of that user device to such a connected mode (e.g. having previously been configured to a connecting mode)

Thus, for example, a user device (joiner) might output audio which is received by another collocated device configured to such a connecting mode and which is thus already participating in the call e.g. if both the user device and the other collocated user device (e.g. 104, 110) are called simultaneously by a third user device e.g. 116 (with the other user device thus receiving that bespoke ringtone prior to that other user device joining the call but whilst that other user device is nonetheless already participating in the call).

It should be noted that the afore-mentioned connections established by clients 106 and 112 are established independently from client 106 receiving any audio signal. That is, receipt of the ringtone from loudspeaker 111 does not cause these connections to be established (but may, of course, influence how data is communicated using those already-established connections e.g. as described above); clients 106 and 112 still establish respective network connections by which they participate in, and join, the call (and thus by which they communicate with one another) even if no ringtone is received via microphone 105 (although the call may, of course, be handled differently in this instance).

The process of generating the ringtone (S306) will now be described with reference to FIGS. 4A, 4B and 4C.

Figure 4A:
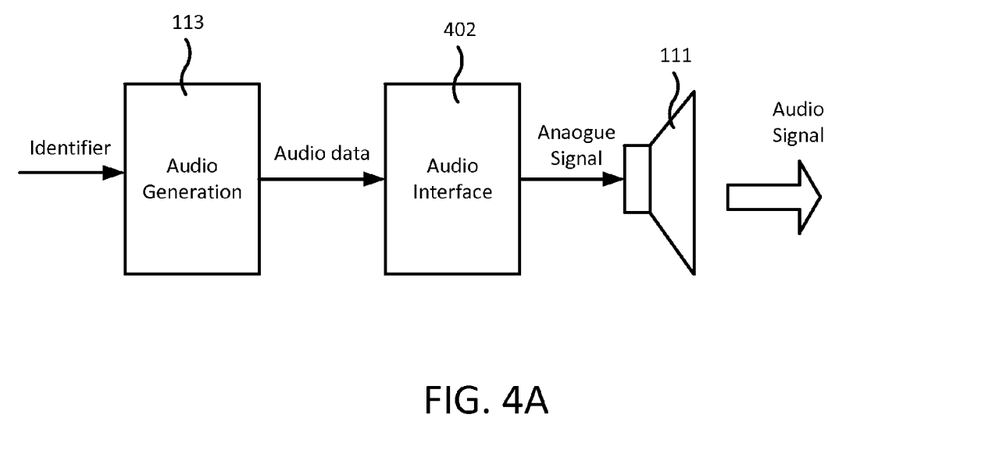
FIG. 4A is a schematic illustration of a system for generating and outputting audio.
Figure 4B:
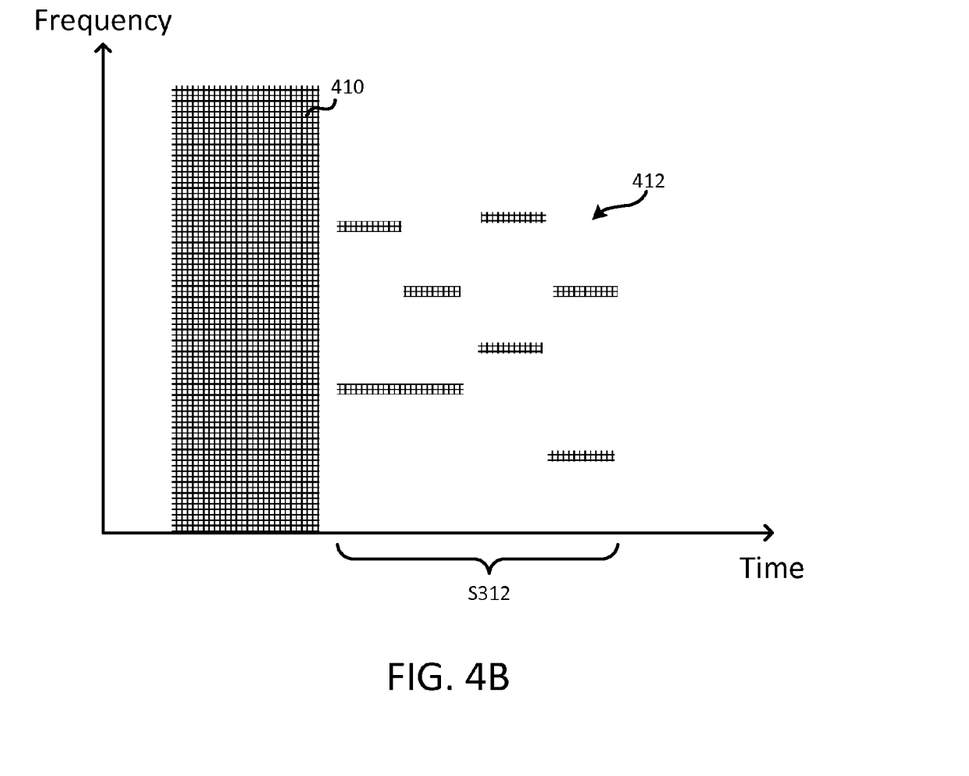
FIG. 4B is a schematic time-frequency representation of audio output by a user device.

FIG. 4A shows a system for generating and outputting audio in the form of a bespoke ringtone, implemented at user device 110. The system comprises audio processing block 107 which is coupled to an audio interface 402 of user device 110, itself coupled to loudspeaker 111. Audio generation block receives non-audio data comprising the identifier associated with the second user device 110 as an input and generates audio data of the bespoke ringtone automatically based on this non-audio data. This generated audio data is then output to audio interface 402 of user device 110. Audio interface 402 is coupled to loudspeaker 111 and, among other things, is responsible for converting the audio data into an analogue (electrical) signal which is input to loudspeaker 111. Loudspeaker 111 then converts this analogue signal into an audio (acoustic) signal, thereby playing-out the bespoke ringtone.

Audio generation block 113 may use procedural audio to generate the ringtone i.e. a process whereby sound (e.g. ringtone) is generated using sound synthesis, from scratch using for example (but not limited to) mathematical functions or random processes.

The ring tone is composed with a common part (mainly for compatibility with legacy clients) and a part which codes the identifier (or the identifier having been mapped thereto).

Figure 4C:
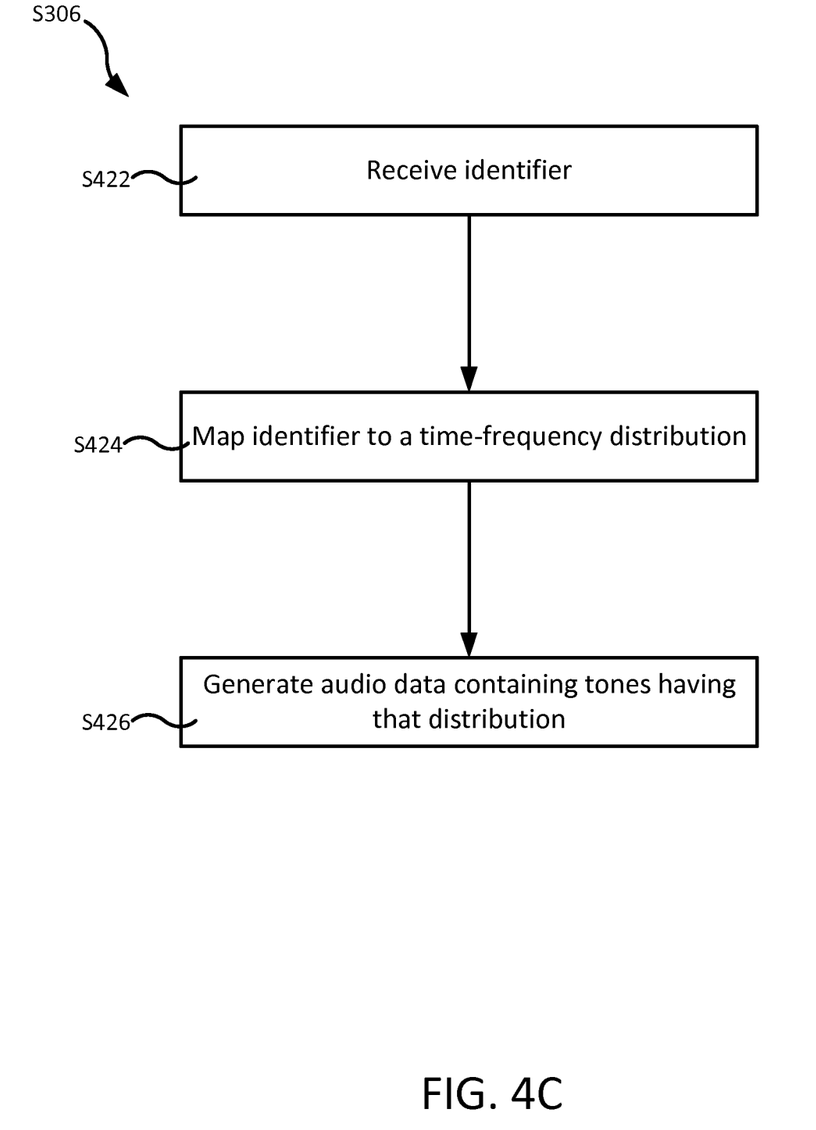
FIG. 4C is a schematic overview of a method for generating a bespoke ringtone.

A schematic overview of a method for generating the audio data of the bespoke ringtone—implemented by block 113 at S306—is shown in FIG. 4C. Block 113 is operable to receive the identifier (S422); map the identifier to a time-frequency distribution (S424); and to generate audio data containing tones having that time-frequency distribution (S426). The use of the time frequency scheme enables reuse of filter bank analysis used in existing client-side echo cancel algorithms (e.g. results of such analysis could be used to identify joiners as well as being used for echo cancellation. In alternative embodiment, other encoding techniques are employed which do not use a filter bank.

FIG. 4B shows an example of a possible schematic of the bespoke ringtone using a time-frequency representation, which is output at step S312. As shown in FIG. 4B, the bespoke ringtone contains a plurality of narrow band tones (for example, but not limited to, substantially sinusoidal tones) having a time-frequency distribution 412; it is this distribution which codes the identifier (the identifier having been mapped thereto). The generated ringtone may also contain other frequency components (not shown) e.g. a component which is substantially homogenous across a range of frequencies, provided the discrete tones are discernible therefrom (i.e. have sufficient energy relative thereto to be separable therefrom). For instance, in embodiments, a generated audio component (e.g. comprising a plurality of tones) may be embedded or modulated in a predetermined ringtone.

Figure 6A:
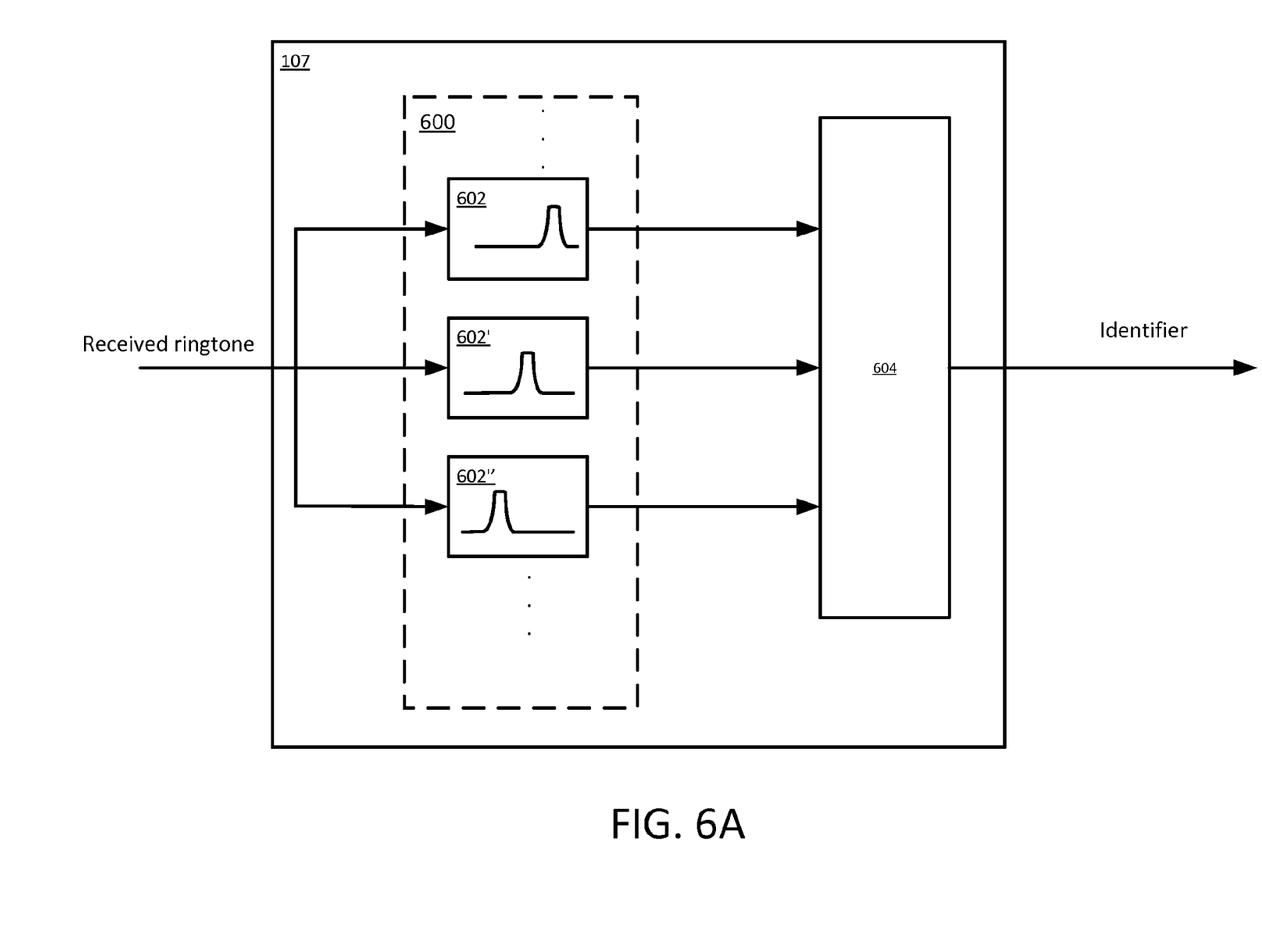
FIG. 6A is a schematic illustration of an audio processing block.

The bespoke ringtone as played-out in step S312 is effectively a modulated ringtone which contains an encoded joiner identifier, with each "symbol" used for coding the joiner identifier effectively being energy in one-or-more specific frequency (sub)bands of the played-out ringtone. These specific frequency subbands are aligned with a suitably tuned, receiver-side filter bank (600; FIG. 6A) thus enabling the bespoke ringtone to be demodulated, and the identifier decoded, by performing a filter bank analysis with that filter bank.

In one embodiment, the identifier of client 112 is a hexadecimal identifier, formed of a sequence of hexadecimal characters, which is coded according to a scheme analogous, in some respects, to Dual-Tone Multi-Frequency signaling (DTMF). As known in the art, DTMF enables information to be conveyed using 16 possible pairings of tones and is conventionally used for telecommunication signaling over analogue telephone lines (i.e. signaling using electrical signals). The inventors have recognized that a modified DTMF scheme can, in fact, be applied in the present context, for conveying information over air (i.e. signaling using acoustic, audio signals).

In this embodiment, S422 of FIG. 4C involves mapping each character of the identifier to a pair of frequencies according to a coding scheme defined in table 1 (below), and the audio data generated in S426 is generated to contain a sequence of tone pairs at those frequencies. So, for instance, an input identifier "1B8F" would be mapped, by generation block 113, to generate audio data containing a sequence of tone pairs at frequencies 1209 Hz+697 Hz, 1633 Hz+770 Hz, 1336 Hz+852 Hz, and 1477 Hz+941 Hz. This audio data would then be played out as an audio signal at step S312.

TABLE 1 coding scheme.

| | 1209 Hz | 1336 Hz | 1477 Hz | 1633 Hz |
|---|---|---|---|---|
| 697 Hz | 1 | 2 | 3 | A |
| 770 Hz | 4 | 5 | 6 | B |
| 852 Hz | 7 | 8 | 9 | C |
| 941 Hz | E | 0 | F | D |

The frequencies of table 1 are such that harmonics and intermodulation products will not cause an unreliable signal: no frequency is a multiple of another, the difference between any two of these frequencies does not equal any of these frequencies, and the sum of any two of these frequencies does not equal any of these frequencies.

This is just one exemplary embodiment and, as will be apparent, there are many possible ways in which audio can be generated to code an identifier as a time-frequency distribution of tones—e.g. as a sequence of single tones, a sequence which includes at least two contemporaneous tones (e.g. at least one tone pair, tone triplet etc.), or as more complex distributions.

Figure 5:
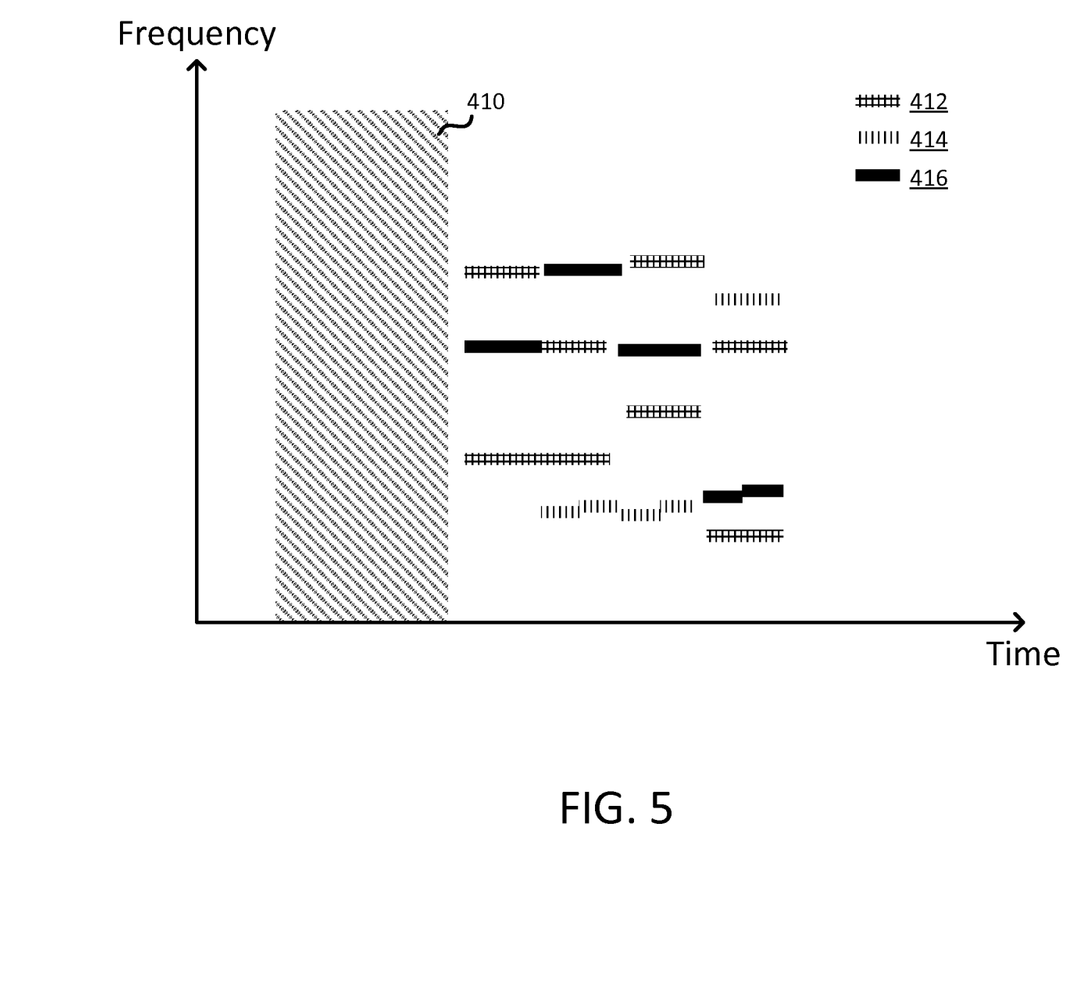
FIG. 5 is a schematic time-frequency representation of audio output by multiple user devices.

FIG. 5 represents generated ringtones 412, 414 and 416 for a plurality of joiners (that is, a plurality of user devices which join the call, each of which plays out a generated ringtone upon joining the call) in one embodiment. As illustrated in FIG. 5, after an initial period in which each joiner plays-out a generic, pre-recorded ringtone 410, each joiner generates and plays-out a respective unique ringtone (412, 414, 416) comprising a unique time-frequency distribution of tones coding a respective unique identifier. Whilst these are shown as being played-out simultaneously in FIG. 5 for ease of comparison, it will be appreciated that different joiners may in fact join the call and play out their respective ringtones at different times.

The process of detecting and decoding bespoke ringtones will now be described with reference to FIGS. 6A and 6B.

During detection phase S314, audio processing block 107 of client 106 processes audio captured by microphone 105. In this embodiment, block 107 detects a bespoke ringtone and extracts the identifier therefrom (effectively decoding/demodulating the bespoke ringtone) by decoding the bespoke ringtone in the processed audio. In this embodiment, the captured audio is processed by performing a filter bank analysis with suitably tuned filter bank—a technique known in the art—to identify narrow band components (tones) therein.

FIG. 6A is a schematic illustration of audio processing block 107. Block 107 comprises a filter bank 600 and a detection and identification block 604. The filter bank 600 comprises a plurality of band-pass filters 602, each of which is operable to receive a copy of the captured audio signal during detection phase S314. The filter bank thus decomposes the captured audio into a plurality of subband signals (one for each filter), which are received by block 604. In some embodiments, the filter bank form part of an echo cancellation system implemented by client 106 i.e. which provides an output to an echo cancellation component of client 106, with this output of the filter bank being 're-used' (i.e. used concurrently) for joiner identification. Using the same filter bank for both echo cancellation and joiner identification makes efficient use of computer resources of device 104.

The ringtone is tuned to match filters of the filter bank. For example, in the embodiment described with reference to table 1 in which 8 discrete frequencies are used to code identifiers, filter bank 600 comprises 8 band-pass filters tunes respectively to each of those 8 frequencies. The ringtone may, for instance, be tuned to match tones of an existing filter-bank of the client which is used for an echo cancellation process by that client, and which is adapted for further use in identifying joiners (see above). There could be more sub-bands in the analysis stage that are present in the ringtone (i.e. the ringtone may be tuned to match only a selection of filters of the client-side filter bank)

Figure 6B:
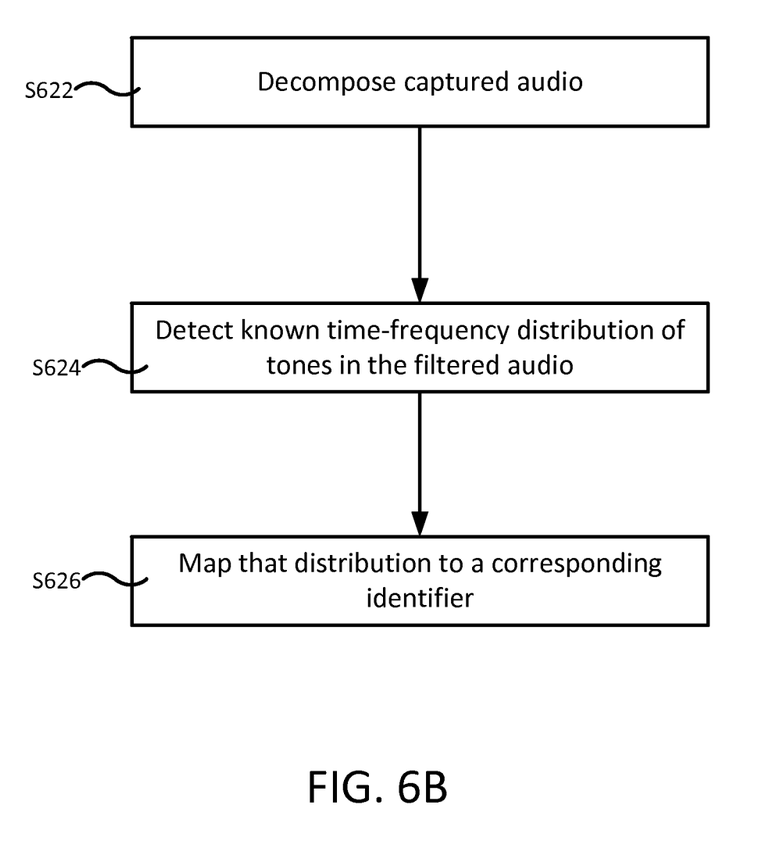
FIG. 6B is a schematic overview of method performed during a detection phase.

FIG. 6B is a schematic overview of a method performed by block 107 during the detection phase. The captured audio is decomposed using filter bank 600 (S622). The decomposed audio is received by detection and identification block 604 which is able to detect, from the sub-band signals, whether a bespoke is present in the captured audio by determining whether or not one or more known time-frequency distributions of tones are present in the decomposed audio (S624). If present, block 604 is operable to map the known distribution(s) to a corresponding identifier (S626) according to a predefined decoding rule.

For instance, in the embodiment described with reference to table 1, S624 involves detecting whether or not any frequency pairings as defined in table 1 are present; S626 then involves then mapping each such pair of frequencies to a respective character (each pair representing a known distribution) to extract the identifier from the identifier from the received audio in accordance with table 1 (which defines the decoding rule). For instance, block 604 might detect a dominant pair of tones occurring contemporaneously in the filtered audio at (say) 1336 Hz and 852 Hz respectively, which it is operable to then map to the character "8" as per table 1 etc.

Alternatively, block 107 may process captured audio by performing a frequency-domain transformation on the captured audio e.g. by performing a Fast Fourier transform or by using a Goertzel algorithm. Such audio processing techniques are, again, known in the art. The bespoke ringtone can then be detected by detecting specific, known arrangements of narrow-band tones in the frequency domain, and said distribution can then be mapped to a corresponding identifier as above.

As will be appreciated, the type of modulation described above (in which each "symbol" used for coding the joiner identifier is effectively energy in one-or-more specific frequency (sub)bands of the played-out ringtone) is only one example of a particular type of modulation. Other suitable types of modulation will be apparent such as (but not limited to) modulation over a carrier, phase modulation etc.

Further, in alternative embodiments, an identifier of a user device may be coded into audio generated at that user device in the form of an inaudible (sonic) "watermark", the watermark effectively being overlaid on (e.g.) existing audio to generate new (bespoke) audio (e.g. the inaudible watermark may be injected into an audio stream of a generic ringtone in order to generate a bespoke ringtone coding the identifier). Techniques for coding and decoding information in the form of inaudible "watermarks" are known in the art e.g. any watermarking scheme such as, but not limited to, spread spectrum audio watermarking (SSW) which uses the whole audio spectrum to embed information. In general, embodiments may modify existing audio may to generate new (bespoke) audio—into which an identifier is coded (both using inaudible watermarks and other coding techniques). For example, in embodiments, bespoke audio may be generated by modulating or embedding a generated component in a pre-determined ringtone.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user devices may also include an entity (e.g. software) that causes hardware of the user devices to perform operations, e.g., processors functional blocks, and so on. For example, the user devices may include a computer-readable medium that may be configured to maintain instructions that cause the user devices, and more particularly the operating system and associated hardware of the user devices to perform operations. Thus, the instructions function to configure the operating system and associated hardware to perform the operations and in this way result in transformation of the operating system and associated hardware to perform functions. The instructions may be provided by the computer-readable medium to the user devices through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A user device comprising:
a network interface for connecting to a network;
an audio output component for outputting audio signals to a loudspeaker of the user device;
a processor configured to execute a communication client, said client operable to:
  join a call conducted over said network;
  at the user device, code an identifier of the user device into audio generated at the user device;
  during the call, output said audio via the audio output component such that said audio can be received by a microphone of another user device, and processed to identify the user device by the another user device, in the vicinity of the user device, already participating in the call;
  determine that the another user device has identified the user device; and
  responsive to said determination, do at least one of:
    notify a user of the user device of said identification via a user interface of the client;
    reduce an audio level at the user device;
    supply audio from an audio input component of the user device to an audio processing component for processing; or
    trigger selection by a selection component of one of an audio input component of the user device, or an audio input component of the another user device, for use during the call.

2. The user device according to claim 1, wherein each user device which joins the call generates respective audio which can be processed to identify that user device, the audio generated by the user device being unique to at least one of: the user device and a user of the user device within the call.

3. The user device according to claim 1, wherein said identifier is coded in said audio as one of: a time-frequency distribution of the audio or an audio watermark.

4. The user device according to claim 1, wherein said audio output by the client of said user device contains a plurality of discernible tones which code said identifier.

5. The user device according to claim 4, wherein said tones correspond to filters of a filter bank.

6. The user device according to claim 1, wherein the audio is output by the client upon joining the call.

7. The user device according to claim 1, wherein the audio is generated using a procedural audio algorithm.

8. The user device according to claim 1, wherein the identifier is numerical, alphabetical, or alphanumerical.

9. A user device comprising:
a network interface for connecting to a network;
an audio input component for receiving audio signals from a loudspeaker of a second user device;
a processor configured to execute a communication client, said client operable to:
  participate in a call conducted over said network;
  whilst the client is participating in the call, receive audio via the audio input component, said audio having been generated at the second user device in the vicinity of the user device and output by the second user device during the call, an identifier associated with the second user device having been coded into said audio at the second user device;
  at the user device, extract the identifier from the received audio to identify the second user device; and
  do at least one of:
    transmit, in response to said identification, a notification to the network so as to inform the second user device of said identification;

supply audio from the audio input component of the user device to an audio processing component for processing; or trigger selection by a selection component of one of the audio input component of the user device, or an audio input component of the second user device, for use during the call.

10. The user device according to claim 9, wherein said audio contains a plurality of discernible tones having a time-frequency distribution, said distribution coding said identifier.

11. The user device according to claim 9, wherein said processing comprises performing a filter bank analysis.

12. The user device according to claim 9, wherein the user device is operable to cause operation of at least one of the user device or the second user device to be modified in response to said identification.

13. The user device according to claim 9, wherein the client is operable to transmit the notification to a call manager managing the call.

14. The user device according to claim 9, wherein the user device is operable to receive said audio during a detection phase instigated in response to receiving, from the network, a notification of the second user device having joined the call.

15. A method of handling a call conducted over a network, the method being performed at a user device whilst participating in said call and comprising:

receiving audio via an audio input component of the user device, said audio having been generated by a second user device in the vicinity of the user device and output by a loudspeaker of the second user device during the call, an identifier associated with the user device having been coded into said audio at the second user device;

responsive to said receiving the audio, extracting the identifier to identify the second user device; and performing at least one of:
transmitting, in response said identification, a notification to the network so as to inform the second user device of said identification;
supplying audio from the audio input component of the user device to an audio processing component for processing; or
triggering selection by a selection component of one of the audio input component of the user device, or an audio input component of the second user device, for use during the call.

16. The method of claim 15, wherein said audio comprises a plurality of discernible tones having a time-frequency distribution, said tones correspond to filters of a filter bank, and said distribution codes an identifier associated with the second user device.

17. The method of claim 15, wherein the identifier is numerical, alphabetical, or alphanumerical.

18. The method of claim 15, wherein said extracting comprises performing filter bank analysis using a filter bank.

19. The method of claim 15, wherein said identifier is coded in said audio as one of: a time-frequency distribution of the audio or an audio watermark.

20. The method of claim 15, wherein each user device which joins the call generates respective audio which can be processed to identify that user device, the audio generated by the user device being unique to at least one of:
the user device and a user of the user device within the call.

21. A user device comprising:
a network interface for connecting to a network;
an audio output component for outputting audio signals;
a processor configured to execute a communication client, said client operable to:
join a call conducted over said network;
at the user device, code an identifier into audio generated at the user device;
during the call, output said audio via the audio output component such that said audio can be received and processed to identify the user device by a second user device, in the vicinity of the user device, already participating in the call;
determine that the second user device has identified the user device; and
responsive to said determination, do at least one of:
notify a user of the user device of said identification via a user interface of the client
reduce an audio level at the user device;
supply audio from an audio input component of the user device to an audio processing component for processing;
trigger selection by a selection component of one of an audio input component of the user device and an audio input component of the second user device for use during the call.

22. A user device comprising:
a network interface for connecting to a network;
an audio input component for receiving audio signals;
a processor configured to execute a communication client, said client operable to:
participate in a call conducted over said network;
whilst the client is participating in the call, receive audio via the audio input component, said audio having been generated at a second user device in the vicinity of the user device and output by the second user device during the call, an identifier associated with the user device having been coded into said audio at the second user device;
at the user device, extract the identifier from the received audio to identify the second user device; and
do at least one of:
transmit, in response to said identification, a notification to the network so as to inform the second user device of said identification;
supply audio from the audio input component of the user device to an audio processing component for processing;
trigger selection by a selection component of one of the audio input component of the user device and an audio input component of the second user device for use during the call.

* * * * *